United States Patent
Wang et al.

(10) Patent No.: US 11,414,728 B2
(45) Date of Patent: *Aug. 16, 2022

(54) COBALT BASED ALLOY PRODUCT, METHOD FOR MANUFACTURING SAME, AND COBALT BASED ALLOY ARTICLE

(71) Applicant: Mitsubishi Heavy Industries, Ltd., Tokyo (JP)

(72) Inventors: Yuting Wang, Tokyo (JP); Shinya Imano, Tokyo (JP); Shigenobu Eguchi, Tokyo (JP)

(73) Assignee: MITSUBISHI HEAVY INDUSTRIES, LTD.

( * ) Notice: Subject to any disclaimer, the term of this patent is extended or adjusted under 35 U.S.C. 154(b) by 279 days.

This patent is subject to a terminal disclaimer.

(21) Appl. No.: 16/620,719

(22) PCT Filed: Mar. 7, 2019

(86) PCT No.: PCT/JP2019/009205
§ 371 (c)(1),
(2) Date: Dec. 9, 2019

(87) PCT Pub. No.: WO2020/179080
PCT Pub. Date: Sep. 10, 2020

(65) Prior Publication Data
US 2021/0340645 A1 Nov. 4, 2021

(51) Int. Cl.
*C22C 19/07* (2006.01)
*B33Y 70/00* (2020.01)
(Continued)

(52) U.S. Cl.
CPC ............. *C22C 19/07* (2013.01); *B22F 10/28* (2021.01); *B22F 10/36* (2021.01); *B22F 10/64* (2021.01);
(Continued)

(58) Field of Classification Search
CPC ...................................................... C22C 19/07
See application file for complete search history.

(56) References Cited

U.S. PATENT DOCUMENTS 3,937,628 A 2/1976 Watanabe et al.
4,437,913 A 3/1984 Fukui et al.
(Continued)

FOREIGN PATENT DOCUMENTS

CA 3061851 A1 11/2019
CN 1053094 A 7/1991
(Continued)

OTHER PUBLICATIONS

Google translate machine translation of MX 2015016373 A retrieved on Nov. 8, 2021 (Year: 2017).*
(Continued)

*Primary Examiner* — Jophy S. Koshy
*Assistant Examiner* — Joshua S Carpenter
(74) *Attorney, Agent, or Firm* — Volpe Koenig

(57) ABSTRACT

There is provided a cobalt-based alloy product comprising: in mass %, 0.08-0.25% C; 0.1% or less B; 10-30% Cr; 5% or less Fe and 30% or less Ni, the total amount of Fe and Ni being 30% or less; W and/or Mo, the total amount of W and Mo being 5-12%; at least one of Ti, Zr, Hf, V, Nb and Ta, the total amount of Ti, Zr, Hf, V, Nb and Ta being 0.5-2%; 0.5% or less Si; 0.5% or less Mn; 0.003-0.04% N; and the balance being Co and impurities. The cobalt-based alloy product is a polycrystalline body of matrix phase crystal grains, wherein MC type carbide phase grains are dispersively precipitated in the matrix phase crystal grains at an average intergrain distance of 0.13 to 2 μm and $M_{23}C_6$ type carbide phase grains are precipitated on grain boundaries of the matrix phase crystal grains.

7 Claims, 6 Drawing Sheets

(51) Int. Cl.
- *B33Y 80/00* (2015.01)
- *C22C 1/04* (2006.01)
- *B33Y 10/00* (2015.01)
- *B22F 5/04* (2006.01)
- *F01D 5/28* (2006.01)
- *B22F 10/28* (2021.01)
- *B22F 10/64* (2021.01)
- *B33Y 40/20* (2020.01)
- *B22F 10/36* (2021.01)
- *F28F 21/08* (2006.01)

(52) U.S. Cl.
CPC ............. *B33Y 40/20* (2020.01); *B33Y 70/00* (2014.12); *B33Y 80/00* (2014.12); *C22C 1/0433* (2013.01); *B22F 5/04* (2013.01); *B33Y 10/00* (2014.12); *F01D 5/286* (2013.01); *F05D 2300/17* (2013.01); *F28F 21/081* (2013.01)

(56) References Cited

U.S. PATENT DOCUMENTS

| | | |
|---|---|---|
| 4,789,412 A | 12/1988 | Nakamura et al. |
| 5,403,547 A | 4/1995 | Smith et al. |
| 5,640,667 A | 6/1997 | Freitag et al. |
| 7,067,201 B2 | 6/2006 | Ellis et al. |
| 7,165,325 B2 | 1/2007 | Imano et al. |
| 9,346,101 B2 | 5/2016 | Zheng et al. |
| 10,632,535 B2 | 4/2020 | Imano et al. |
| 2004/0033158 A1 | 2/2004 | Chiba et al. |
| 2004/0050114 A1 | 3/2004 | Berthod et al. |
| 2008/0185078 A1 | 8/2008 | Ishida et al. |
| 2010/0296962 A1 | 11/2010 | Hasselqvist et al. |
| 2012/0279351 A1 | 11/2012 | Gu et al. |
| 2013/0206287 A1 | 8/2013 | Sato et al. |
| 2013/0263977 A1 | 10/2013 | Rickenbacher et al. |
| 2014/0295087 A1 | 10/2014 | Rickenbacher et al. |
| 2015/0068629 A1 | 3/2015 | Kottilingam et al. |
| 2016/0151860 A1 | 6/2016 | Engeli et al. |
| 2016/0175934 A1 | 6/2016 | Lacy et al. |
| 2016/0200045 A1 | 7/2016 | Hopkins et al. |
| 2016/0258298 A1 | 9/2016 | Channel et al. |
| 2017/0241287 A1 | 8/2017 | Nakamura et al. |
| 2017/0291220 A1 | 10/2017 | Nakamura et al. |
| 2018/0264547 A1 | 9/2018 | Tamura et al. |
| 2019/0076926 A1* | 3/2019 | Imano ................. C22F 1/10 |
| 2019/0226058 A1 | 7/2019 | Fujieda et al. |
| 2020/0016658 A1 | 1/2020 | Imano et al. |
| 2020/0016659 A1 | 1/2020 | Imano et al. |
| 2020/0094325 A1 | 3/2020 | Taneike et al. |
| 2021/0332460 A1 | 10/2021 | Wang et al. |

FOREIGN PATENT DOCUMENTS

| | | | |
|---|---|---|---|
| CN | 101528959 A | 9/2009 | |
| CN | 103069028 A | 4/2013 | |
| CN | 107513642 A | 12/2017 | |
| EP | 1378579 B1 | 11/2005 | |
| JP | 55-076038 A2 | 6/1980 | |
| JP | 58-042741 A2 | 3/1983 | |
| JP | 58-117848 A2 | 7/1983 | |
| JP | 61-243143 A | 10/1986 | |
| JP | 63-011638 A | 1/1988 | |
| JP | 63-011638 A2 | 1/1988 | |
| JP | 06-287667 A | 10/1994 | |
| JP | 07-179967 A | 7/1995 | |
| JP | 09-157780 A | 6/1997 | |
| JP | H09-157780 A * | 6/1997 | ............. C22C 19/07 |
| JP | 2002-249838 A | 9/2002 | |
| JP | 2006-089796 A | 4/2006 | |
| JP | 2009-228024 A | 10/2009 | |
| JP | 2015-072007 A | 4/2015 | |
| JP | 2016-029217 A | 3/2016 | |
| JP | 2016-102229 A | 6/2016 | |
| JP | 2016-102257 A | 6/2016 | |
| JP | 2016-535169 A | 11/2016 | |
| JP | 2017-145483 A | 8/2017 | |
| JP | 2017-186620 A | 10/2017 | |
| JP | 6311638 B2 | 4/2018 | |
| JP | 2019-049022 A | 3/2019 | |
| JP | 06-509290 B2 | 5/2019 | |
| JP | 2019-173175 A | 10/2019 | |
| JP | 2020-143379 A | 9/2020 | |
| MX | 2015016373 A * | 5/2017 | ............. A61K 6/04 |
| WO | 1997/010368 A1 | 3/1997 | |
| WO | 2013/087515 A1 | 6/2013 | |
| WO | 2015/073081 A1 | 5/2015 | |
| WO | 2018/181098 A1 | 10/2018 | |
| WO | 2019/031577 A1 | 2/2019 | |
| WO | 2020/121367 A1 | 6/2020 | |
| WO | 2020/179080 A1 | 9/2020 | |
| WO | 2020/179081 A1 | 9/2020 | |
| WO | 2020/179083 A1 | 9/2020 | |
| WO | 2020/179084 A1 | 9/2020 | |
| WO | 2020/179085 A1 | 9/2020 | |
| WO | 2021/033546 A1 | 2/2021 | |
| WO | 2021/033547 A1 | 2/2021 | |
| WO | 2021/131167 A1 | 7/2021 | |

OTHER PUBLICATIONS

Espacenet machine translation of JP H09-157780 A retrieved on May 25, 2022 (Year: 1997).*
International Search Report, PCT/JP2019/009205, dated Jun. 4, 2019, 3 pgs. (Japanese language only).
Yuan et al., "Effect of Nitrogen on Microstructure and Properties of a Cast Cobalt-base Superalloy", Advanced Materials Research, vol. 278, pp. 472-478, (2011).
Sears, "Laser Additive Manufacturing for Improved Wear and Performance", Advances in Powder Metallurgy & Particulate Materials, Metal Powder Industries Federation, Princeton, NJ, US, vol. 8 (2009).
Holt et al., "Impurities and Trace Elements in Nickel-base Superalloys", International Metals Reviews, pp. 1-24, Mar. 1976.
Extended European Search Report dated Dec. 4, 2019 for the European Patent Application No. 19197441.9.
Extended European Search Report dated Dec. 4, 2019 for the European Patent Application No. 19197443.5.
Chinese Office Action dated Apr. 27, 2020 for the Chinese Patent Application No. 201811040282.2.
Extended European Search Report dated Nov. 9, 2020 for the European Patent Application No. 19813222.7.
Extended European Search Report dated Nov. 9, 2020 for the European Patent Application No. 19808959.1.
International Search Report dated Nov. 17, 2020 for International Application No. PCT/JP2020/033544.
Extended European Search Report issued in European Application No. 18192365.7, dated Nov. 8, 2018, 10 pages.
International Search Report issued in International Application No. PCT/JP2019/009206, dated Jun. 4, 2019, 5 pages. (English translation 2 pages).
International Search Report issued in International Application No. PCT/JP2019/009208, dated Jun. 4, 2019, 5 pages. (English translation 2 pages).
International Search Report issued in International Application No. PCT/JP2019/009209, dated Jun. 4, 2019, 5 pages. (English translation 2 pages).
International Search Report issued in International Application No. PCT/JP2019/009210, dated Jun. 11, 2019, 3 pages. (English translation 1 page).
Tan et al., "Carbide precipitation characteristics in additive manufacturing of Co—Cr—Mo alloy via selective electron beam melting." Scripta Materialia 143: 117-121 (2018).
International Search Report, PCT/JP2020/033547, dated Nov. 11, 2020; 3 pgs.
Canadian Office Action dated Apr. 13, 2021 for Canadian Patent Application No. 3 061 851.

(56) References Cited

OTHER PUBLICATIONS

Yuan, C., et al., "Effect of Nitrogen on Microstructure and Properties of a Cast Cobalt-Base Superalloy," Advanced Materials Research, vol. 278, (2011).
International Search Report, PCT/JP2020/033546, dated Nov. 17, 2020, 3 pgs. (Japanese only).
Extended European Search Report dated Nov. 30, 2020 for European Patent Application No. 19808671.2.
U.S. Office Action dated Jan. 8, 2021 for U.S. Appl. No. 16/582,517.
Indian Office Action dated Mar. 1, 2021 for Indian Patent Application No. 201814033368.
Japanese Office Action dated Feb. 24, 2021 for Japanese Patent Application No. 2020-509122.
Japanese Office Action dated Feb. 24, 2021 for Japanese Patent Application No. 2020-509117.
Japanese Office Action dated Feb. 24, 2021 for Japanese Patent Application No. 2020-508062.
Australian Office Action dated Oct. 14, 2020 for Australian Patent Application No. 2018422117.

* cited by examiner

COBALT BASED ALLOY PRODUCT, METHOD FOR MANUFACTURING SAME, AND COBALT BASED ALLOY ARTICLE

TECHNICAL FIELD OF THE INVENTION

The present invention relates to cobalt based alloy materials having excellent mechanical properties and, in particular, to a cobalt based alloy product, a method for manufacturing the same, and a cobalt based alloy article.

DESCRIPTION OF BACKGROUND ART

Cobalt (Co) based alloy articles, along with nickel (Ni) based alloy articles, are representative heat resistant alloy materials. Also referred to as super alloys, they are widely used for high temperature members (components used under high temperature environment, e.g. gas turbine members, steam turbine members, etc.). Although Co based alloy articles are higher in material costs than Ni based alloy articles, they have been used for applications such as turbine stator blades and combustor members because of their excellence in corrosion resistance and abrasion resistance, and their ease of solid solution strengthening.

In Ni based alloy materials, various improvements that have been made so far in composition and manufacturing processes of heat resistant alloy materials have led to the development of strengthening through γ' phase (e.g. $Ni_3(Al, Ti)$ phase) precipitation, which has now become mainstream. On the other hand, in Co based alloy materials, an intermetallic compound phase that contributes to improving mechanical properties, like the γ' phase in Ni based alloy materials, hardly precipitates, which has prompted research on carbide phase precipitation strengthening.

For example, Patent Literature 1 (JP Shou 61 (1986)-243143 A) discloses a Co based superplastic alloy made up of a Co based alloy matrix having a crystal grain size of equal to or less than 10 μm and carbide grains in a granular form or a particulate form having a grain size of 0.5 to 10 μm precipitated in the matrix. The Co based alloy includes 0.15 to 1 wt. % of C, 15 to 40 wt. % of Cr, 3 to 15 wt. % of W or Mo, 1 wt. % or less of B, 0 to 20 wt. % of Ni, 0 to 1.0 wt. % of Nb, 0 to 1.0 wt. % of Zr, 0 to 1.0 wt. % of Ta, 0 to 3 wt. % of Ti, 0 to 3 wt. % of Al, and the balance of Co. According to Patent Literature 1 (JP Shou 61 (1986)-243143 A), there can be provided a Co based superplastic alloy that exhibits superplasticity accompanying with an elongation of equal to or more than 70% even in a low temperature range (e.g. at 950° C.), and is capable of being formed into an article with a complicated shape by plastic working such as forging.

Patent Literature 2 (JP Hei 7 (1995)-179967 A) discloses a Co based alloy that is excellent in corrosion resistance, abrasion resistance, and high temperature strength. The alloy includes 21 to 29 wt. % of Cr, 15 to 24 wt. % of Mo, 0.5 to 2 wt. % of B, 0.1 or more and less than 0.5 wt. % of Si, more than 1 and equal to or less than 2 wt. % of C, 2 wt. % or less of Fe, 2 wt. % or less of Ni, and the balance of substantially Co. According to Patent Literature 2 (JP Hei 7 (1995)-179967 A), the Co based alloy has a composite structure in which a molybdenum boride and a chromium carbide are relatively finely dispersed in a quaternary alloy phase of Co, Cr, Mo and Si and exhibits excellent corrosion resistance, abrasion resistance, and high strength.

Meanwhile, in recent years, three dimensional shaping technology (the so-called 3D printing) such as additive manufacturing or AM has received much attention as a technique for manufacturing finished products with a complicated shape by near net shaping. To apply the three dimensional shaping technology to heat resistant alloy components, vigorous research and development activities are currently being carried out.

For example, Patent Literature 3 (JP 2016-535169 A) discloses a method of producing layers including the steps of: (a) providing a source of a powdered or suspended granular composite powder having a porosity of 20% or less; (b) depositing a first portion of said powder onto a target surface; (c) depositing energy into the powder of said first portion under conditions that said energy causes sintering, fusing or melting of the first powder portion so as to create a first layer; (d) depositing a second portion of powder onto said first layer; and (e) depositing energy into the powder of said second portion under conditions that said energy causes sintering, fusing or melting of the second powder portion so as to create a second layer. In the method, the energy is supplied by a laser.

Patent Literature 3 (JP 2016-535169 A) teaches as follows: Selective laser melting (SLM) or direct metal laser melting (DMLM) uses laser to make a material a full melt. Full melting is typically useful for a monomaterial (e.g. pure titanium or a single alloy such as Ti-6Al-4V), as there is just one melting point. By contrast, selective laser sintering (SLS) and direct metal laser sintering (DMLS) are essentially the same thing, and SLS/DMLS is used to apply processes to a variety of materials multiple metals, alloys, or combinations of alloys and other materials such as plastics, ceramics, polymers, carbides or glasses. Meanwhile, sintering is apart from melting, and a sintering process does not fully melt a material but heats it to the point that the material can fuse together on a molecular level.

CITATION LIST

Patent Literature

Patent Literature 1: JP Shou 61 (1986)-243143 A,
Patent Literature 2: JP Hei 7 (1995)-179967 A, and
Patent Literature 3: JP 2016-535169 A.

SUMMARY OF THE INVENTION

Problems to be Solved by the Invention

Since the 3D printing is capable of directly forming even components of complicated shape, manufacturing of turbine high temperature components by the 3D printing is very attractive in terms of reduction of manufacturing work time and improvement of manufacturing yield (i.e. reduction of manufacturing cost).

Co based alloy materials such as the ones disclosed in Patent Literatures 1 and 2 are thought to have mechanical properties superior to those of previous Co based alloy materials. Unfortunately, however, their mechanical properties are inferior to those of precipitation-strengthened Ni based alloy materials of recent years. Therefore, many studies on additively manufactured articles (AM articles) for use as high temperature components are currently directed toward precipitation-strengthened Ni based alloy materials.

However, AM articles of the precipitation-strengthened Ni based alloys are prone to have problems such as generation of the γ' phase, which is the core of their mechanical properties, being hindered and internal defects occurring in the finished products. As a result, expected mechanical properties have not been sufficiently achieved. This is attributable to the fact that current precipitation-strengthened Ni based alloy materials used for high temperature components have been optimized through melting and forging processes under high vacuum, and therefore oxidation and nitriding of the Al component and the Ti component, which constitute the γ' phase, easily occur at the stages of preparing alloy powder for AM and performing AM.

On the other hand, manufacturing the Co based alloy materials such as the ones disclosed in Patent Literatures 1 and 2 does not require precipitation of an intermetallic compound phase such as the γ' phase as in Ni based alloy materials, so Co based alloy materials do not contain plenty of Al or Ti, which is easily oxidized. This means melting and forging processes in the air atmosphere are available for their manufacturing. Therefore, such Co based alloy materials are considered to be advantageous in manufacturing of alloy powder for AM and manufacturing of AM articles. Also, the Co based alloy materials have advantages with corrosion resistance and abrasion resistance comparable to or superior to those of Ni based alloy materials.

However, as mentioned above, conventional Co based alloy materials have disadvantages of mechanical properties inferior to those of γ' phase precipitation-strengthened Ni based alloy materials. In other words, if a Co based alloy material could achieve mechanical properties comparable to or superior to those of γ' phase precipitation-strengthened Ni based alloy materials (e.g. a creep rupture time of 1,100 hours or more by a creep test under conditions of a temperature of 900° C. and a stress of 98 MPa), AM articles of the Co based alloy material would become highly attractive high temperature components.

The present invention was made in view of the foregoing and has an objective to provide a Co based alloy product having mechanical properties comparable to or superior to those of precipitation-strengthened Ni based alloy materials, and a method for manufacturing the Co based alloy product. Also, another objective of the invention is to provide an article as a base material for the Co based alloy product.

Solution to Problems (I) According to one aspect of the present invention, there is provided a cobalt based alloy product. The cobalt based alloy product has a chemical composition including: 0.08 to 0.25 mass % of carbon (C); 0.1 mass % or less of boron (B); 10 to 30 mass % of chromium (Cr); 5 mass % or less of iron (Fe) and 30 mass % or less of nickel (Ni), the total amount of the Fe and the Ni being 30 mass % or less; tungsten (W) and/or molybdenum (Mo), the total amount of the W and the Mo being 5 to 12 mass %; at least one of titanium (Ti), zirconium (Zr), hafnium (Hf), vanadium (V), niobium (Nb) and tantalum (Ta), the total amount of the Ti, the Zr, the Hf, the V, the Nb and the Ta being 0.5 to 2 mass %; 0.5 mass % or less of silicon (Si); 0.5 mass % or less of manganese (Mn); 0.003 to 0.04 mass % of nitrogen (N); and the balance being cobalt (Co) and impurities. The impurities include 0.5 mass % or less of aluminum (Al), and 0.04 mass % or less of oxygen (O). The product is a polycrystalline body of matrix phase crystal grains. In the polycrystalline body, MC type carbide phase grains and $M_{23}C_6$ type carbide phase grains are co-precipitated. The MC type carbide phase grains are dispersively precipitated in the matrix phase crystal grains at an average intergrain distance of 0.13 to 2 μm; and the $M_{23}C_6$ type carbide phase grains are precipitated on grain boundaries of the matrix phase crystal grains.

In the above Co based alloy product (I) of the invention, the following changes and modifications can be made.

(i) The MC type carbide phase grains may be grains of an MC type carbide phase including the Ti, the Zr, the Hf, the V, the Nb and/or the Ta; and the $M_{23}C_6$ type carbide phase grains may be grains of an $M_{23}C_6$ type carbide phase including the Cr, the Fe, the W, the Mo and/or the Mn.

(ii) In the case that the chemical composition includes the Ti, content of the Ti may be 0.01 to 1 mass %; in the case that the chemical composition includes the Zr, content of the Zr may be 0.05 to 1.5 mass %; in the case that the chemical composition includes the Hf, content of the Hf may be 0.01 to 0.5 mass %; in the case that the chemical composition includes the V, content of the V may be 0.01 to 0.5 mass %; in the case that the chemical composition includes the Nb, content of the Nb may be 0.02 to 1 mass %; and in the case that the chemical composition includes the Ta, content of the Ta may be 0.05 to 1.5 mass %.

(iii) The product may exhibit a creep rupture time of 1,200 hours or more by a creep test under conditions of a temperature of 850° C. and a stress of 168 MPa.

(iv) The product may be a high temperature member.

(v) The high temperature member may be a turbine stator blade, a turbine rotor blade, a turbine combustor nozzle, or a heat exchanger.

(II) According to another aspect of the invention, there is provided a method for manufacturing the above Co based alloy product. The manufacturing method includes: an alloy powder preparation step of preparing a cobalt based alloy powder having the chemical composition, the cobalt based alloy powder having a predetermined particle size; a selective laser melting step of forming an additively manufactured article, the step comprising alternate repetition of an alloy powder bed preparation substep of laying the Co based alloy powder such that it forms an alloy powder bed having a predetermined thickness and a laser melting solidification substep of irradiating a predetermined region of the alloy powder bed with a laser beam to locally melt and rapidly solidify the Co based alloy powder in the region, the laser beam having a predetermined output power and a predetermined scanning speed; and a first heat treatment step of subjecting the additively manufactured article to a first heat treatment at a temperature ranging of 750° C. or more but less than 1,100° C.; and a second heat treatment step of subjecting the first heat-treated article to a second heat treatment at a temperature ranging from 600° C. to 1,000° C. but less than the temperature of the first heat treatment. In the a selective laser melting step, the predetermined thickness of the alloy powder bed h (unit: μm), the predetermined output power of the laser beam P (unit: W), and the predetermined scanning speed of the laser beam S (unit: mm/s) are controlled to satisfy the following formulas: "$15<h<150$" and "$67\times(P/S)-3.5<h<2222\times(P/S)+13$".

In the above manufacturing method of the Co based alloy product (II) of the invention, the following changes and modifications can be made.

(v) The alloy powder preparation step may include an alloy powder classification substep of regulating the particle size of the cobalt based alloy powder to 5 to 100 μm.

Advantages of the Invention

According to the present invention, there can be provided a Co based alloy product having mechanical properties comparable to or superior to those of precipitation-strengthened Ni based alloy materials, and a method for manufacturing the Co based alloy product. Also, there can be provided an article as a base material for the Co based alloy product.

DETAILED DESCRIPTION OF THE PREFERRED EMBODIMENTS

[Basic Concept of the Present Invention]

Figure 1:
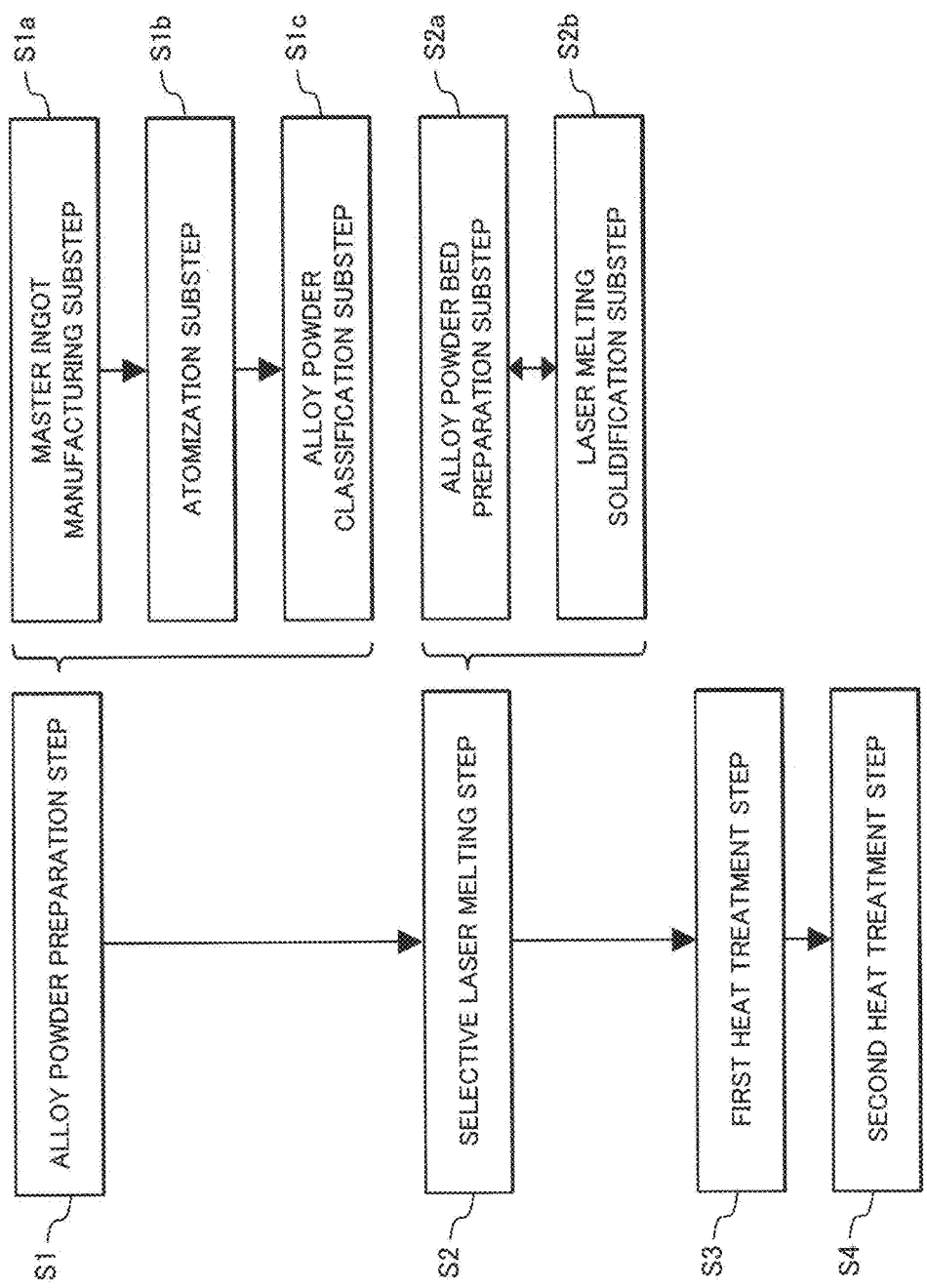
FIG. 1 is a flow diagram showing an exemplary process of a method for manufacturing a Co based alloy product according to an embodiment of the present invention.

As mentioned before, various research and development activities have been carried out on strengthening of Co based alloy materials through carbide phase precipitation. Carbide phases that contribute to precipitation strengthening include, e.g., MC type carbide phases of Ti, Zr, Hf, V, Nb and Ta, and complex carbide phases of these metallic elements.

The C component, which is indispensable in formation of a carbide phase with each of Ti, Zr, Hf, V, Nb and Ta, tends to segregate significantly at final solidification portions (e.g. dendrite boundaries, crystal grain boundaries, etc.) at the melting and solidification stages of the Co based alloy. So, in conventional Co based alloy materials, the carbide phase grains precipitate along the dendrite boundaries and crystal grain boundaries in the matrix. In a general cast material of a Co based alloy, for example, the average spacing between dendrite boundaries and the average crystal grain size are on the order of $10^1$ to $10^2$ µm, and therefore the average spacing between carbide phase grains is also on the order of $10^1$ to $10^2$ µm. Furthermore, even with the relatively fast solidification rate of laser welding, for example, the average spacing between carbide phase grains at the solidified portions is around 5 µm.

Precipitation strengthening in alloys is generally known to be inversely proportional to the average spacing between precipitates, and it is considered that precipitation strengthening is effective only when the average spacing between precipitates is around 2 µm or less. However, with the above-mentioned conventional technology, the average spacing between precipitates has not reached this level in a Co based alloy material, and sufficient precipitation strengthening effect has not been achieved. In other words, with the conventional technology, it has been difficult to finely and dispersedly precipitate carbide phase grains that might contribute to strengthening alloys. This would be the main factor behind the fact that Co based alloy materials have been said to have mechanical properties inferior to those of precipitation-strengthened Ni based alloy materials.

Meanwhile, another carbide phase that can precipitate in Co based alloys is the Cr carbide phase. Since the Cr component is highly solid soluble to the Co based alloy matrix and hardly segregate, the Cr carbide phase can be dispersedly precipitated in the matrix phase crystal grains. However, the Cr carbide phase is poor in lattice matching with the Co based alloy matrix crystals and is known to be not so effective as a precipitation-strengthening phase.

The present inventors thought that if they were able to dispersedly precipitate carbide phase grains contributing to precipitation strengthening in the matrix phase crystal grains, they would be able to dramatically improve mechanical properties of Co based alloy materials. Considering the inherent excellent corrosion resistance and abrasion resistance of Co based alloy materials, they would be able to provide a heat-resistant alloy material that would surpass precipitation-strengthened Ni based alloy materials.

Then, in order to obtain such a Co based alloy material, the inventors conducted intensive research on alloy compositions and manufacturing methods. As a result, they have found that segregation cells with a small size are formed, in which specific components (components forming carbide phases contributing to alloy strengthening) are segregated, in the matrix phase crystal grains of a Co based alloy additively manufactured article by optimizing the alloy composition and controlling the amount of heat input for local melting and rapid solidification in an additive manufacturing method (in particular, selective laser melting). Furthermore, they have found that it is possible to dispersedly and finely precipitate MC type carbide phase grains in the matrix phase crystal grains and to precipitate $M_{23}C_6$ type carbide phase grains on boundaries of the matrix phase crystal grains by conducting a specific heat treatment to the obtained AM article. The present invention was made based on these findings.

Preferred embodiments of the present invention will be hereinafter described with reference to the accompanying drawings. However, the invention is not limited to the specific embodiments described below, and various combinations with known art and modifications based on known art are possible without departing from the spirit and the scope of the invention.

[Method for Manufacturing Co Based Alloy Product]

FIG. 1 is a flow diagram showing an exemplary process of a method for manufacturing a Co based alloy product according to an embodiment of the invention. As shown in FIG. 1, the method for manufacturing a Co based alloy product roughly includes: an alloy powder preparation step S1 of preparing a Co based alloy powder; a selective laser melting step S2 of forming the prepared Co based alloy powder into an AM article with a desired shape; a first heat treatment step S3 of conducting a first heat treatment to the AM article formed, and a second heat treatment step S4 of conducting a second heat treatment to the AM article conducted with the first heat treatment.

In addition, although not shown in FIG. 1, a Co based alloy product of the invention may be an article that is further applied a corrosion resistant coating formation step and/or a surface finishing step to the Co based alloy product obtained through the second heat treatment step S4. Also, a Co based alloy powder itself prepared by the alloy powder preparation step S1 may be an article according to the invention as a base material for the Co based alloy product.

Each step will be hereinafter described in more detail.

(Alloy Powder Preparation Step)

In the step S1, a Co based alloy powder having a predetermined chemical composition is prepared. The chemical composition preferably includes: 0.08 to 0.25 mass % of C; 0.1 mass % or less of B; 10 to 30 mass % of Cr; 5 mass % or less of Fe and 30 mass % or less of Ni, the total amount of the Fe and the Ni being 30 mass % or less; W and/or Mo, the total amount of the W and the Mo being 5 to 12 mass %; at least one of Ti, Zr, Hf, V, Nb and Ta, the total amount of the Ti, the Zr, the Hf, the V, the Nb and the Ta being 0.5 to 2 mass %; 0.5 mass % or less of Si; 0.5 mass % or less of Mn; 0.003 to 0.04 mass % of N; and the balance being Co and impurities. As impurities, 0.5 mass % or less of Al and 0.04 mass % or less of O may be included.

C: 0.08 to 0.25 Mass %

The C component is an important component that constitutes an MC type carbide phase to serve as a precipitation strengthening phase (this MC type carbide phase may be referred to as "carbide phase of Ti, Zr, Hf, V, Nb and/or Ta" or "precipitation reinforcing carbide phase"). Also, the C component is an important component that constitutes an $M_{23}C_6$ type carbide phase to serve as a grain boundary slip suppressing phase of the matrix phase crystal grains (this $M_{23}C_6$ type carbide phase may be referred to as "carbide phase of Cr, Fe, W, Mo and/or Mn" or "grain boundary strengthening carbide phase"). The content of the C component is preferably 0.08 to 0.25 mass %, more preferably 0.1 to 0.2 mass %, and even more preferably 0.12 to 0.18 mass %. When the C content is less than 0.08 mass %, the amount of precipitation of the precipitation reinforcing carbide phase and the grain boundary strengthening carbide phase is insufficient, resulting in an insufficient effect of improving the mechanical properties. By contrast, when the C content is over 0.25 mass %, carbide phases other than the MC type carbide phase precipitate excessively, and/or the alloy material becomes excessively hard, which leads to deteriorated ductility and toughness.

B: 0.1 Mass % or Less

The B component contributes to improving bondability between crystal grain boundaries (the so-called grain boundary strengthening). Although the B is not an essential component, when it is contained in the alloy, the content of the B component is preferably 0.1 mass % or less and more preferably 0.005 to 0.05 mass %. When the B component is over 0.1 mass %, cracking (e.g. solidification cracking) is prone to occur during formation of the AM article.

Cr: 10 to 30 Mass %

The Cr component contributes to improving corrosion resistance and oxidation resistance, and is a component that constitutes the grain boundary strengthening carbide phase. The content of the Cr component is preferably 10 to 30 mass % and more preferably 15 to 27 mass %. In the case where a corrosion resistant coating layer is provided on the outermost surface of the Co based alloy product, the content of the Cr component is even more preferably 10 to 18 mass %. When the Cr content is less than 10 mass %, advantageous effects such as improvements of the corrosion resistance and the oxidation resistance and generation of the grain boundary strengthening carbide phase are insufficient. When the Cr content is over 30 mass %, the brittle σ phase and/or the excessive amount of Cr carbide phase are generated, resulting in deteriorated mechanical properties (i.e. toughness, ductility, strength, etc.).

Ni: 30 Mass % or Less

Being similar to Co component in properties but less expensive than Co, the Ni component may be used to replace part of the Co component. Although the Ni is not an essential component, when it is contained in the alloy, the content of the Ni component is preferably 30 mass % or less, more preferably 20 mass % or less, and more preferably 5 to 15 mass %. When the Ni content is over 30 mass %, the abrasion resistance and the local stress resistance, which are characteristics of Co based alloys, deteriorate. This is attributable to the difference in stacking fault energy between Co and Ni.

Fe: 5 Mass % or Less

Being much less expensive than Ni and similar to Ni component in properties, the Fe component may be used to replace part of the Ni component. In addition, the Fe component is a component that can constitute the grain boundary strengthening carbide phase. The total content of the Fe and Ni is preferably 30 mass % or less, more preferably 20 mass % or less, and even more preferably 5 to 15 mass %. Although the Fe is not an essential component, when it is contained in the alloy, the content of the Fe component is preferably 5 mass % or less and more preferably 3 mass % or less in the range less than the Ni content. When the Fe content is over 5 mass %, the corrosion resistance and mechanical properties deteriorate.

W and/or Mo: 5 to 12 Mass % in Total

The W component and the Mo component contribute to solution-strengthening the matrix. Furthermore, part of the W and Mo components may constitute the grain boundary strengthening carbide phase. The total content of the W component and/or the Mo component (at least one of W and Mo components) is preferably 5 to 12 mass % and more preferably 7 to 10 mass %. When the total content of the W component and the Mo component is less than 5 mass %, the solution strengthening of the matrix is insufficient. In contrast, when the total content of the W component and the Mo component is over 12 mass %, the brittle σ phase tends to be generated easily, resulting in deteriorated mechanical properties (i.e. toughness, ductility, etc.).

Re: 2 Mass % or Less

The Re component contributes to solution-strengthening the matrix and improving corrosion resistance. Although the Re is not an essential component, when it is contained in the alloy to replace part of the W component or the Mo component, the content of the Re component is preferably 2 mass % or less and more preferably 0.5 to 1.5 mass %. When the Re content is over 2 mass %, the advantageous effects of the Re component become saturated, and the material costs become too high.

Ti, Zr, Hf, V, Nb and Ta: 0.5 to 2 Mass % in Total

The Ti component, the Zr component, the Hf component, the V component, the Nb component, and the Ta component are important components that constitute the precipitation reinforcing carbide phase (the MC type carbide phase), and at least one of these components are preferably included. The total content of the Ti, Zr, Hf, V, Nb and Ta components is preferably 0.5 to 2 mass % and more preferably 0.5 to 1.8 mass %. When the total content is less than 0.5 mass %, the amount of precipitation of the precipitation reinforcing carbide phase is insufficient, and, as a result, the effect of improving the mechanical properties is insufficient. In contrast, when the total content is over 2 mass %, the mechanical properties deteriorate due to coarsening of the grains of the precipitation reinforcing carbide phase, accelerated generation of a brittle phase (e.g. σ phase), generation of grains of an oxide phase that does not contribute to precipitation strengthening, etc.

More specifically, when the Ti component is included, the Ti content is preferably 0.01 to 1 mass % and more preferably 0.05 to 0.8 mass %.

When the Zr component is included, the Zr content is preferably 0.05 to 1.5 mass % and more preferably 0.1 to 1.2 mass %. From the viewpoint of the mechanical strength, it is preferable that the Zr component is included in the alloy.

When the Hf component is included, the Hf content is preferably 0.01 to 0.5 mass % and more preferably 0.02 to 0.1 mass %.

When the V component is included, the V content is preferably 0.01 to 0.5 mass % and more preferably 0.02 to 0.1 mass %.

When the Nb component is included, the Nb content is preferably 0.02 to 1 mass % and more preferably 0.05 to 0.8 mass %.

When the Ta component is included, the Ta content is preferably 0.05 to 1.5 mass % and more preferably 0.1 to 1.2 mass %.

Si: 0.5 Mass % or Less

The Si component serves as a deoxidant agent and contributes to improving the mechanical properties. Although the Si is not an essential component, when it is contained in the alloy, the content of the Si component is preferably 0.5 mass % or less and more preferably 0.01 to 0.3 mass %. When the Si content is over 0.5 mass %, coarse grains of an oxide (e.g. $SiO_2$) are generated, which causes deterioration of the mechanical properties.

Mn: 0.5 Mass % or Less

The Mn component serves as a deoxidant agent and a desulfurizing agent and contributes to improving the mechanical properties and the corrosion resistance. In addition, the Mn component is a component that may constitute the grain boundary strengthening carbide phase. Although the Mn is not an essential component, when it is contained in the alloy, the content of the Mn component is preferably 0.5 mass % or less and more preferably 0.01 to 0.3 mass %. When the Mn content is over 0.5 mass %, coarse grains of a sulfide (e.g. MnS) are generated, which causes deterioration of the mechanical properties and the corrosion resistance.

N: 0.003 to 0.04 Mass %

The N component contributes to stabilizing the generation of the precipitation reinforcing carbide phase. The content of the N component is preferably 0.003 to 0.04 mass %, more preferably 0.005 to 0.03 mass %, and even more preferably 0.007 to 0.025 mass %. When the N content is less than 0.003 mass %, the advantageous effects of the N component are insufficient. Meanwhile, when the N content is over 0.04 mass %, coarse grains of a nitride (e.g. Cr nitride) are generated, which causes deterioration of the mechanical properties.

Balance: Co Component and Impurities

The Co component is one of the key components of the alloy and its content is the largest of all the components. As mentioned above, Co based alloy materials have the advantages of having corrosion resistance and abrasion resistance comparable to or superior to those of Ni based alloy materials.

The Al component is one of the impurities of the alloy and is not to be intentionally included in the alloy. However, an Al content of 0.5 mass % or less is acceptable as it does not have any serious negative influence on the mechanical properties of the Co based alloy product. When the Al content is over 0.5 mass %, coarse grains of an oxide or nitride (e.g. $Al_2O_3$ or AlN) are generated, which causes deterioration of the mechanical properties.

The O component is also one of the impurities of the alloy and is not to be intentionally included in the alloy. However, an O content of 0.04 mass % or less is acceptable as it does not have any serious negative influence on the mechanical properties of the Co based alloy product. When the O content is over 0.04 mass %, coarse grains of each oxide (e.g. Ti oxide, Zr oxide, Al oxide, Fe oxide, Si oxide, etc.) are generated, which causes deterioration of the mechanical properties.

In this step S1, there is no particular limitation on the method and techniques for preparing the Co based alloy powder, and any conventional method and technique may be used. For example, a master ingot manufacturing substep S1a of manufacturing a master ingot by mixing, melting, and casting the raw materials such that the ingot has a desired chemical composition and an atomization substep S1b of forming the alloy powder from the master ingot may be performed. Also, there is no particular limitation on the atomization method, and any conventional method and technique may be used. For example, gas atomizing or centrifugal force atomizing, by which spherical particles of high purity can be obtained, may be preferably used.

For ease of handling and ease of filling the alloy powder bed in the following selective laser melting step S2, the particle size of the alloy powder is preferably 5 to 100 μm, more preferably 10 to 70 μm, and even more preferably 10 to 50 μm. When the particle size of the alloy powder is less than 5 μm, fluidity of the alloy powder decreases in the following step S2 (i.e. formability of the alloy powder bed decreases), which causes deterioration of shape accuracy of the AM article. In contrast, when the particle size of the alloy powder is over 100 μm, controlling the local melting and rapid solidification of the alloy powder bed in the following step S2 becomes difficult, which leads to insufficient melting of the alloy powder and increased surface roughness of the AM article.

In view of the above, an alloy powder classification substep S1c is preferably performed so as to regulate the alloy powder particle size to 5 to 100 μm. In the present invention, when the particle size distribution of the alloy powder manufactured in the atomization substep S1b is observed to fall within the desired range, it is assumed that the substep S1c has been performed.

(Selective Laser Melting Step)

In the step S2, the prepared Co based alloy powder is formed into an AM article having a desired shape by selective laser melting (SLM). More specifically, this step comprises alternate repetition of an alloy powder bed preparation substep S2a and a laser melting solidification substep S2b. In the step S2a, the Co based alloy powder is laid such that it forms an alloy powder bed having a predetermined thickness, and in the step S2b, a predetermined region of the alloy powder bed is irradiated with a laser beam to locally melt and rapidly solidify the Co based alloy powder in the region.

In this step S2, in order to obtain a finished Co based alloy product having a desired microstructure (a microstructure in which the precipitation reinforcing carbide phase grains are dispersedly precipitated in the matrix phase crystal grains), the microstructure of the AM article, which is a precursor of the finished product, is controlled by controlling the local melting and the rapid solidification of the alloy powder bed.

More specifically, the thickness of the alloy powder bed h (unit: μm), the output power of the laser beam P (unit: W), and the scanning speed of the laser beam S (unit: mm/s) are preferably controlled to satisfy the following formulas: "15<h<150" and "67×(P/S)−3.5<h<2222×(P/S)+13". When these formulas are not satisfied, an AM article having a desired microstructure cannot be obtained.

While the output power P and the scanning speed S of the laser beam basically depend on configurations of the laser apparatus, they may be determined so as to satisfy the following formulas: "10≤P≤1000" and "10≤S≤7000".

(Co Based Alloy Additively Manufactured Article)

Figure 2:
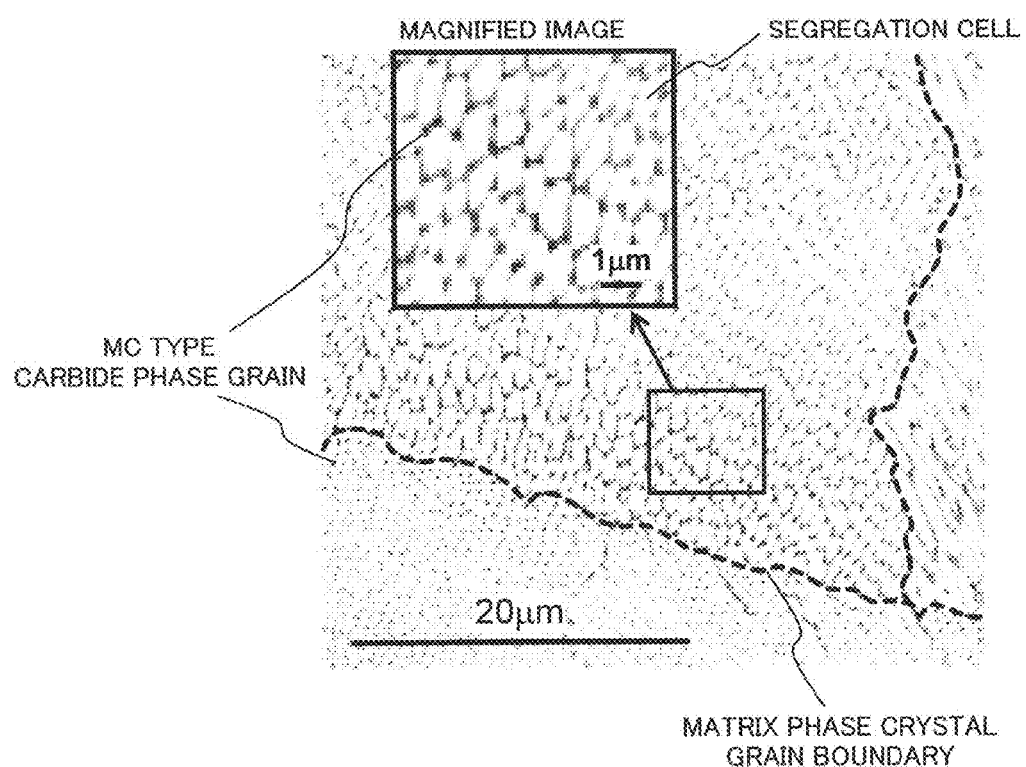
FIG. 2 is a scanning electron microscope (SEM) image showing an exemplary microstructure of a Co based alloy AM article obtained by a selective laser melting (SLM) step.

FIG. 2 is a scanning electron microscope (SEM) image showing an exemplary microstructure of a Co based alloy AM article obtained by the SLM step S2. As shown in FIG. 2, the Co based alloy AM article obtained by the SLM step S2 has a very unique microstructure that has never been seen before.

The AM article is a polycrystalline body of matrix phase crystal grains. In the matrix phase crystal grains of the polycrystalline body, segregation cells with an average size of 0.13 to 2 μm are formed. In the viewpoint of the mechanical strength, segregation cells with an average size of 0.15 to 1.5 μm are more preferable. It may be recognized that the carbide phase grains are precipitated on a part of boundary regions of the segregation cells. In addition, from various experiments by the inventors, it can be recognized that the matrix phase crystal grains with an average size of 5 to 150 μm are preferable.

In the present invention, the size of segregation cells is basically defined as the average of the long diameter and the short diameter. However, when an aspect ratio of the longer diameter and the short diameter is three or more, twice the short diameter may be adopted as the size of segregation cell. Also, average distance among grains of the precipitation reinforcing carbide phase may be defined as the size of segregation cells because the precipitation reinforcing carbide phase grains are precipitated on the boundary regions of the segregation cells.

A more detailed microstructure observation by scanning transmission electron microscopy-energy dispersive X-ray spectrometry (STEM-EDX) has revealed that the components constituting the precipitation reinforcing carbide phase (Ti, Zr, Hf, V, Nb, Ta, and C) segregate in the boundary regions between the neighboring segregation cells (i.e. in outer peripheral regions of micro-cells, similar to cell walls). It has also been observed that grains precipitating on the boundary regions among these segregation cells are MC type carbide phase grains.

Naturally enough, the segregation of the components constituting the MC type carbide phase and the precipitation of the MC type carbide phase grains can be observed also on the grain boundaries of the matrix phase crystal grains in the AM article.

(First Heat Treatment Step)

In the step S3, the formed Co based alloy AM article is subjected to a first heat treatment. The first heat treatment is preferably performed at in a temperature range of 750° C. or more and less than 1,100° C., more preferably of 800° C. or more and 1,050° C. or less, still more preferably of 850° C. or more and 1,000° C. or less. With respect to a holding duration, it may be controlled in a time range of 0.5 to 10 hours taking the heat treatment temperature into consideration. There is no particular limitation on a cooling method after the heat treatment, and oil cooling, water cooling, air cooling, or furnace cooling may be used.

Figure 3:
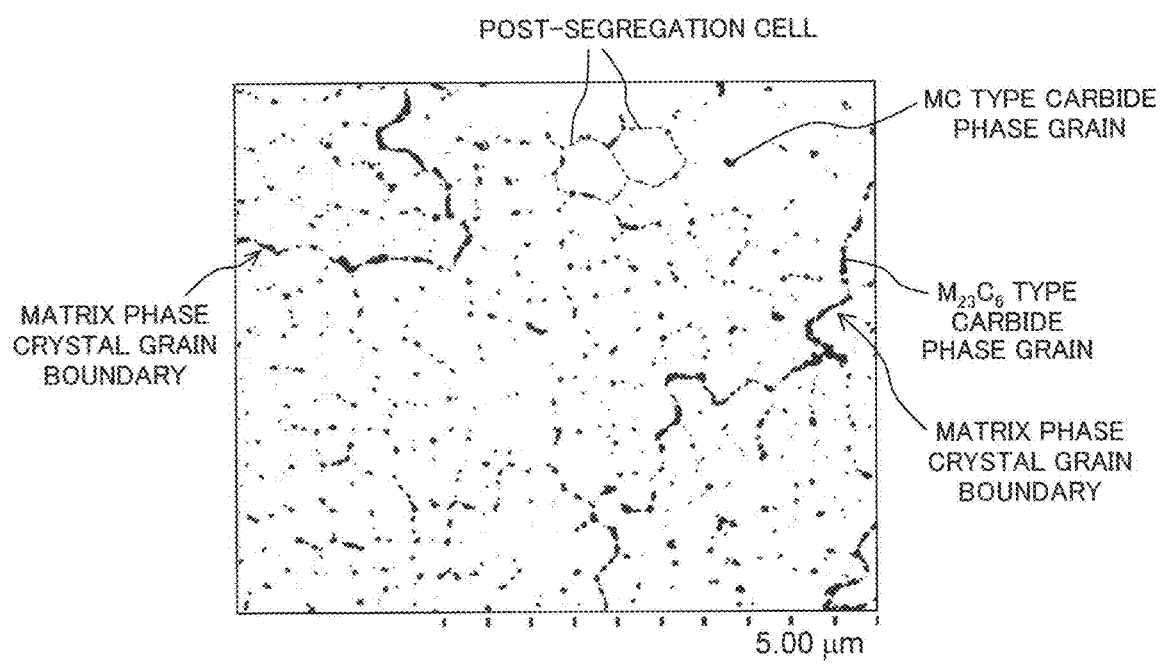
FIG. 3 is an SEM image showing an exemplary microstructure of a Co based alloy AM article obtained through a first heat treatment step.

FIG. 3 is an SEM image showing an exemplary microstructure of a Co based alloy AM article obtained through the first heat treatment step S3. As shown in FIG. 3, also the Co based alloy AM article conducted with the first heat treatment has a unique microstructure that has never been seen before.

Interestingly enough, by conducting the first heat treatment, it has been found that the components segregated in the boundary regions of the segregation cells start to diffuse and combine to form the precipitation reinforcing carbide phase (the MC type carbide phase) on/along the boundary regions, and as a result, cell walls of the segregation cells almost disappear (more specifically, it becomes difficult to observe the cell walls of segregation cells by a microstructure observation). In other words, grains of the precipitation reinforcing carbide phase are formed dispersedly along regions where the cell walls seem to have existed (on the boundary regions of ex-segregation cells). In the present invention, a region surrounded with the MC type carbide phase grains precipitating along a region where the cell wall seems to have existed is referred to as a "post-segregation cell".

It can be considered that a post-segregation cell has almost the same outer form as the segregation cell, and thus an average size of post-segregation cells is in a range of 0.13 to 2 μm. Meanwhile, because the precipitation reinforcing carbide phase grains can act a role as pinning points against grain boundary migration of the matrix phase crystal grains, coarsening of the matrix phase crystal grains is suppressed.

Furthermore, it has been found that the grain boundary strengthening carbide phase (the $M_{23}C_6$ type carbide phase) starts to generate on the grain boundaries of matrix phase crystal grains, in addition to the generation of the precipitation reinforcing carbide phase.

Moreover, by the first heat treatment, residual internal strain of the AM article possibly caused by rapid solidification in the SLM step S2 can be relaxed, and undesired deformation of the alloy product can be restrained during a latter step and using as a high temperature member.

(Second Heat Treatment Step)

In the step S4, the Co alloy AM articles conducted with the first heat treatment is subjected to a second heat treatment. The second heat treatment is preferably performed at a temperature ranging from 600 to 1,000° C. but less than the temperature of the first heat treatment. With respect to a holding duration, it may be controlled in a time range of 0.5 to 20 hours taking the heat treatment temperature into consideration. There is no particular limitation on the cooling method after the second heat treatment, and oil cooling, water cooling, air cooling, or furnace cooling may be used.

Figure 4:
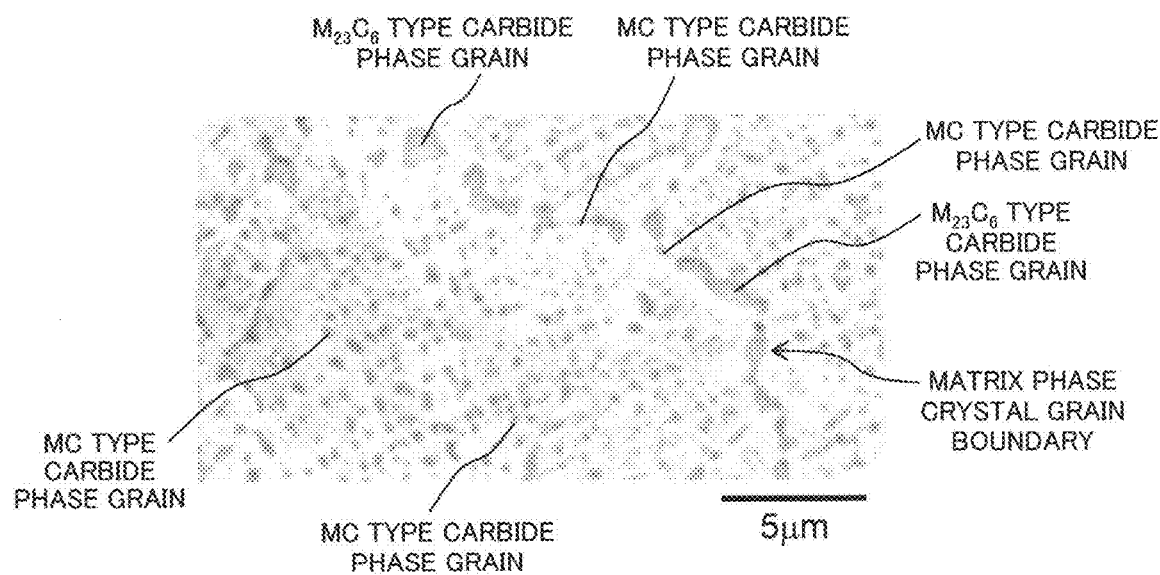
FIG. 4 is an SEM image showing an exemplary microstructure of a Co based alloy product obtained through a second heat treatment step.

FIG. 4 is an SEM image showing an exemplary microstructure of a Co based alloy product obtained through the second heat treatment step S4. As shown in FIG. 4, also the Co based alloy product conducted with the second heat treatment has a unique microstructure that has never been seen before. By performing the second heat treatment, the precipitation reinforcing carbide phase grains and the grain boundary strengthening carbide phase grains can be appropriately grown while suppressing coarsening of the matrix phase crystal grains.

As results of analysis with STEM-EDX, it has been confirmed that the precipitation reinforcing carbide phase can be regarded as an MC type carbide phase including the Ti, Zr, Hf, V, Nb and/or Ta, and the grain boundary strengthening carbide phase can be regarded as an $M_{23}C_6$ type carbide phase including the Cr, Fe, W, Mo and/or Mn.

The Co based alloy product obtained through the step S4 has an average size of the matrix phase crystal grains of 5 to 150 µm, in which the precipitation reinforcing carbide phase grains precipitate dispersedly with an average intergrain distance of 0.13 to 2 µm in the matrix phase crystal grains, and the grain boundary strengthening carbide phase grains precipitate on the grain boundaries of matrix phase crystal grains. Also, the grains of precipitation reinforcing carbide phase are dispersedly precipitated also on the grain boundaries of matrix phase crystal grains in the Co based alloy product according to the invention, as described before.

[Co Based Alloy Product]

Figure 5:
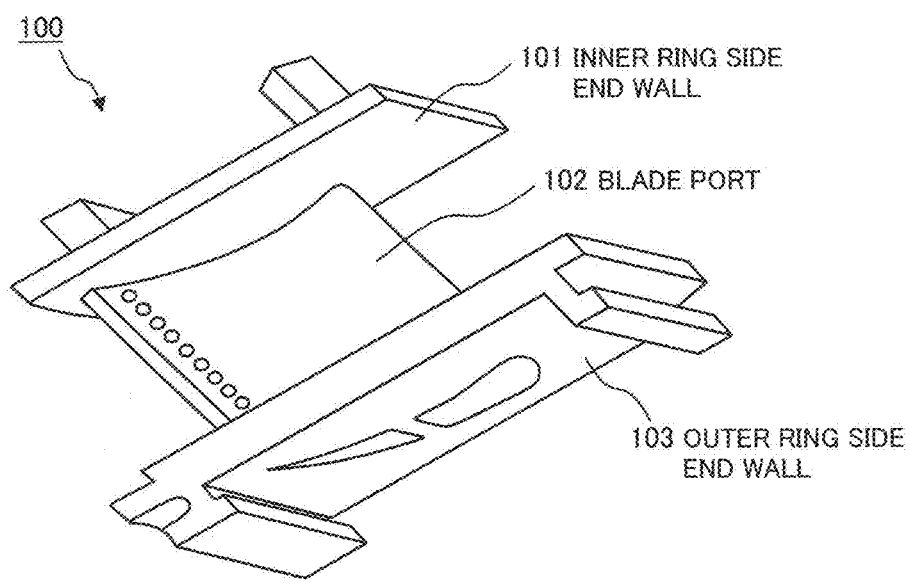
FIG. 5 is a schematic illustration of a perspective view showing a turbine stator blade which is a Co based alloy product as a high temperature member according to an embodiment of the invention.

FIG. 5 is a schematic illustration of a perspective view showing a turbine stator blade which is a Co based alloy product as a high temperature member according to an embodiment of the invention. As shown in FIG. 5, the turbine stator blade 100 includes an inner ring side end wall 101, a blade part 102, and an outer ring side end wall 103. Inside the blade part 102 is often formed a cooling structure. As seen from FIG. 5, since the turbine stator blade 100 has a very complicated shape and structure, the technical significance of AM articles manufactured by near net shaping and alloy products based on the AM articles is profound.

Meanwhile, in the case of a gas turbine for power generation with an output of around 30 MW, the length of the blade part 102 of the turbine stator blade 100 (i.e. distance between the end walls 101 and 103) is approximately 170 mm. Naturally enough, a Co based alloy product of the invention can be used as a turbine rotor blade.

Figure 6:
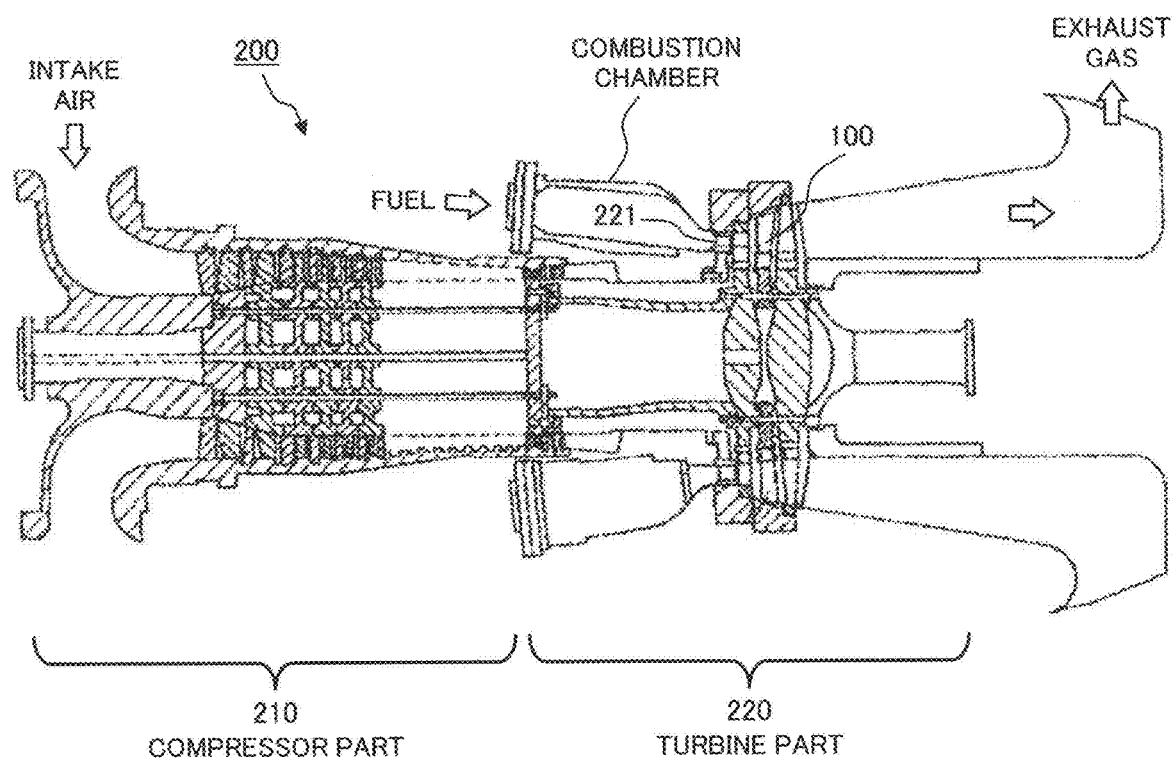
FIG. 6 is a schematic illustration of a cross-sectional view showing a gas turbine equipped with a Co based alloy product according to an embodiment of the invention.

FIG. 6 is a schematic illustration of a cross-sectional view showing a gas turbine equipped with a Co based alloy product according to an embodiment of the invention. As shown in FIG. 6, the gas turbine 200 roughly includes a compression part 210 for compressing intake air and a turbine part 220 for blowing combustion gas of a fuel on turbine blades to obtain rotation power. The high temperature member according to the embodiment of the invention can be preferably used as a turbine nozzle 221 or the turbine stator blade 100 inside the turbine part 220.

Also, the high temperature member according to the embodiment of the invention is not limited to gas turbine applications but may be used for other turbine applications (e.g. steam turbines) and component used under high temperature environment in other machines/apparatuses.

Figure 7:
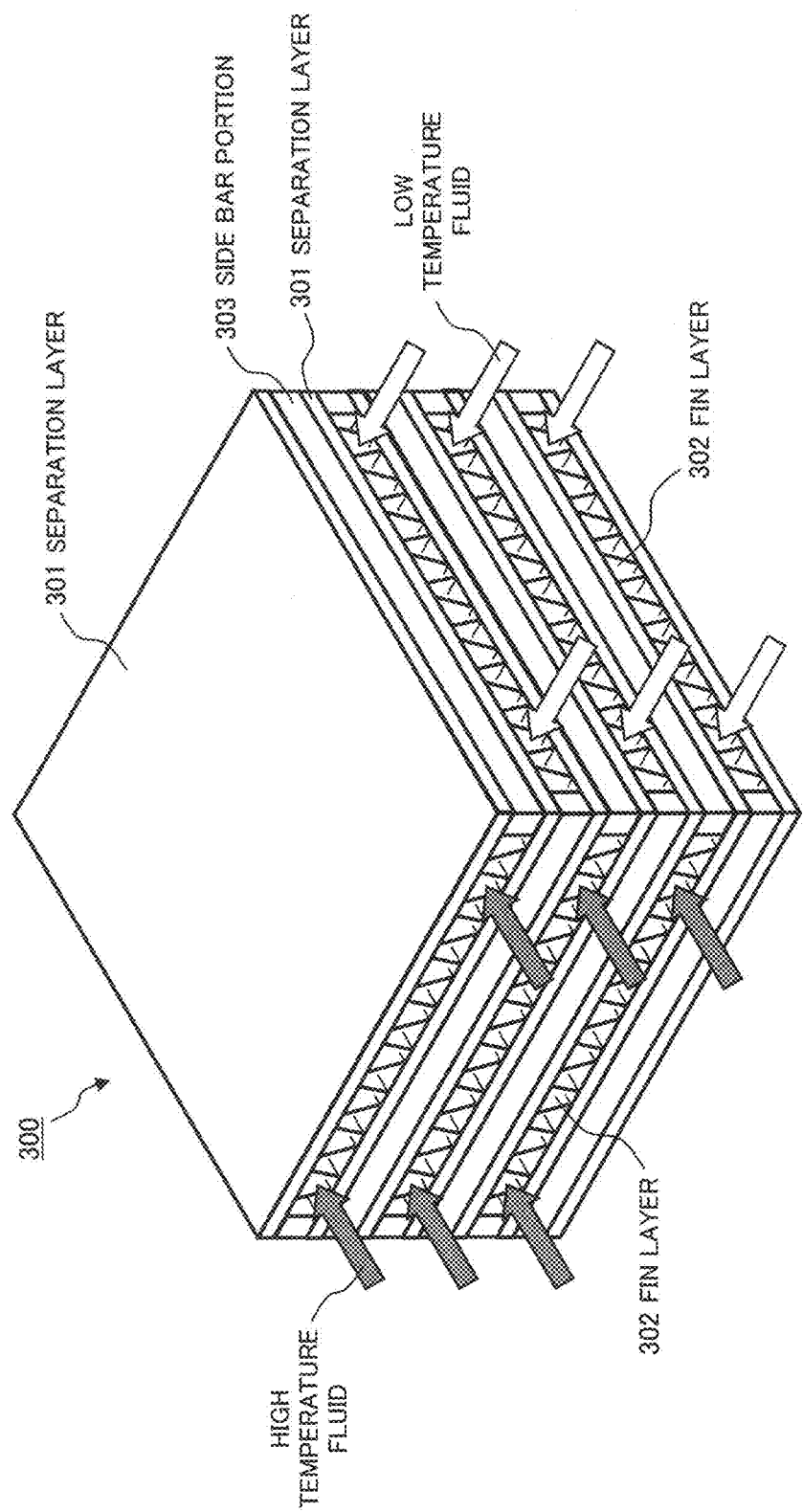
FIG. 7 is a schematic illustration of a perspective view showing a heat exchanger which is a Co based alloy product as a high temperature member according to an embodiment of the invention.

FIG. 7 is a schematic illustration of a perspective view showing a heat exchanger which is a Co based alloy product as a high temperature member according to an embodiment of the invention. A heat exchanger 300 shown in FIG. 6 is an example of a plate-fin type heat exchanger, and has a basic structure in which a separation layer 301 and a fin layer 302 are alternatively stacked each other. Both ends in the width direction of flow channels in the fin layer 302 are sealed by a side bar portion 303. Heat exchanging between high temperature fluid and low temperature fluid can be done by flowing the high temperature fluid and the low temperature fluid alternately into adjacent fin layers 302 via the separation layer 301.

A heat exchanger 300 according to an embodiment of the invention is formed integrally without soldering joining or welding joining the conventional parts constituting a heat exchanger such as separation plates, corrugated fins and side bars. Consequently, the heat exchanger 300 has advantages improving heat resistance and weight reduction than the conventional heat exchangers. In addition, the heat transfer efficiency can be higher by forming an appropriate concavo-convex pattern on the surfaces of the flow channels and making the fluid into turbulence. Improving the heat transfer efficiency leads to downsizing of the heat exchanger.

EXAMPLES

The present invention will be hereinafter described in more detail with examples and comparative examples. It should be noted that the invention is not limited to these examples.

Experimental 1

(Preparation of Alloy Powders IA-1 to IA-7 and CA-1 to CA-5)

Co based alloy powders having the chemical compositions shown in Table 1 were prepared (the alloy powder preparation Step S1). Specifically, first, the master ingot manufacturing substep S1a was performed, in which the raw materials were mixed and subjected to melting and casting by a vacuum high frequency induction melting method so as to form a master ingot (weight: approximately 2 kg) for each powder. Next, the atomization substep S1b was performed to form each alloy powder. In the substep S1b, each master ingot was remelted and subjected to gas atomizing in an argon gas atmosphere.

Then, each alloy powder thus obtained was subjected to the alloy powder classification substep S1c to control the particle size of alloy powder. Each alloy powder was classified into an alloy powder with a particle size of 5 to 25 µm.

TABLE 1

Chemical Compositions of Alloy Powders IA-1 to IA-7 and CA-1 to CA-5.

Chemical Composition (mass %)

| Alloy Powder | C | B | Cr | Ni | Fe | W | Ti | Zr | Hf | V | Nb | Ta | Si | Mn | N | Co | Al | O | Ti + Zr + Hf + V + Nb + Ta |
|---|---|---|---|---|---|---|---|---|---|---|---|---|---|---|---|---|---|---|---|
| IA-1 | 0.16 | 0.009 | 24.7 | 9.3 | 0.01 | 7.5 | 0.16 | 0.45 | — | — | 0.20 | 0.15 | 0.01 | 0.01 | 0.005 | Bal. | 0.01 | 0.005 | 0.96 |
| IA-2 | 0.25 | 0.011 | 26.5 | 10.5 | 0.90 | 7.4 | 0.30 | 0.60 | — | — | 0.15 | 0.40 | 0.30 | 0.20 | 0.030 | Bal. | 0.05 | 0.020 | 1.45 |
| IA-3 | 0.08 | 0.009 | 30.0 | — | — | 5.0 | — | 0.35 | — | — | 0.16 | — | 0.05 | 0.01 | 0.005 | Bal. | — | 0.005 | 0.51 |
| IA-4 | 0.10 | 0.010 | 25.0 | 8.0 | 0.02 | 7.5 | 0.25 | 0.05 | — | — | 0.09 | 0.30 | 0.01 | 0.02 | 0.010 | Bal. | — | 0.010 | 0.69 |
| IA-5 | 0.18 | 0.009 | 24.9 | 9.2 | 0.01 | 7.6 | 0.17 | 0.45 | 0.02 | 0.04 | 0.21 | 0.16 | 0.01 | 0.01 | 0.015 | Bal. | 0.01 | 0.010 | 1.05 |
| IA-6 | 0.24 | 0.011 | 25.5 | 10.3 | 0.90 | 7.4 | 0.20 | 0.60 | 0.05 | 0.02 | 0.15 | 0.40 | 0.30 | 0.20 | 0.040 | Bal. | 0.06 | 0.025 | 1.42 |
| IA-7 | 0.08 | 0.009 | 29.5 | — | — | 6.0 | 0.10 | 0.15 | 0.01 | 0.04 | — | 0.30 | 0.15 | 0.10 | 0.005 | Bal. | — | 0.005 | 0.60 |
| CA-1 | 0.35 | 0.009 | 32.5 | 9.5 | 0.01 | 7.3 | 0.15 | 0.40 | — | — | 0.05 | 0.50 | 0.01 | 0.01 | 0.005 | Bal. | 0.01 | 0.005 | 1.10 |
| CA-2 | 0.35 | 0.009 | 30.0 | 40.0 | 0.01 | 7.3 | 0.90 | 0.40 | — | — | 1.0 | 1.0 | 0.01 | 0.01 | 0.005 | Bal. | 2.20 | 0.005 | 3.30 |
| CA-3 | 0.40 | 0.010 | 29.0 | 10.0 | 0.20 | 7.5 | 0.20 | 0.10 | — | — | 0.10 | — | 0.10 | 0.02 | 0.001 | Bal. | — | 0.015 | 0.40 |

TABLE 1-continued

Chemical Compositions of Alloy Powders IA-1 to IA-7 and CA-1 to CA-5.

Chemical Composition (mass %)

| Alloy Powder | C | B | Cr | Ni | Fe | W | Ti | Zr | Hf | V | Nb | Ta | Si | Mn | N | Co | Al | O | Ti + Zr + Hf + V + Nb + Ta |
|---|---|---|---|---|---|---|---|---|---|---|---|---|---|---|---|---|---|---|---|
| CA-4 | 0.25 | 0.010 | 29.0 | 10.0 | 0.10 | 7.0 | — | — | — | — | — | — | — | 0.01 | 0.010 | Bal. | — | 0.010 | 0 |
| CA-5 | 0.11 | 0.002 | 22.0 | 23.0 | 0.01 | 14.0 | 0.01 | 0.01 | — | — | — | — | 0.50 | 0.003 | 0.006 | Bal. | 0.01 | 0.008 | 0.02 |

"—" indicates that the element was not intentionally included or not detected.
"Bal." indicates inclusion of impurities other than Al and O.

As shown in Table 1, the inventive alloy powders IA-1 to IA-7 have chemical compositions that satisfy the specifications of the invention. In contrast, the comparative alloy powder CA-1 has a C content and a Cr content that fail to satisfy the specifications of the invention. The comparative alloy powder CA-2 has a C content, an Ni content, and a total content of "Ti+Zr+Hf+V+Nb+Ta" that are out of the specifications of the invention. The comparative alloy powder CA-3 has a C content, an N content and a total content of "Ti+Zr+Hf+V+Nb+Ta" that are outside of the specifications of the invention. The comparative alloy powder CA-4 has a total content of "Ti+Zr+Hf+V+Nb+Ta" that fail to satisfy the specifications of the invention. The comparative alloy powder CA-5 has a W content and a total content of "Ti+Zr+Hf+V+Nb+Ta" that are out of the specifications of the invention.

[Experiment 2]
(Examination of SLM Conditions in Selective Laser Melting Step)

AM articles (8 mm in diameter×10 mm in length) were formed of the alloy powders IA-4 prepared in Experimental 1 by the SLM process (selective laser melting step S2). The output power of the laser beam P was set at 85 W, and the local heat input P/S (unit: W×s/mm=J/mm) was controlled by varying the thickness of the alloy powder bed h and the scanning speed (mm/s) of the laser beam S. Controlling the local heat input corresponds to controlling the cooling rate.

The AM articles formed above were each subjected to microstructure observation to measure the average segregation cell size. The microstructure observation was performed by SEM. Also, the obtained SEM images were subjected to image analysis using an image processing program (ImageJ, a public domain program developed at the National Institutes of Health in U.S.A., or NIH) to measure the average size of segregation cells.

Figure 8:
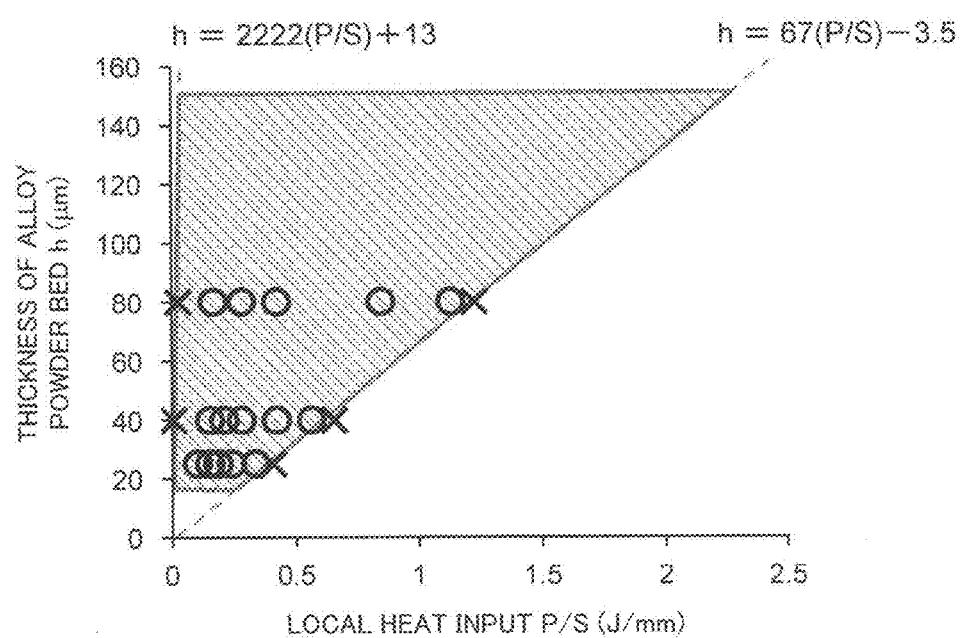
FIG. 8 shows exemplary selective laser melting (SLM) conditions in the SLM step, indicating a relationship between a thickness of an alloy powder bed and a local heat input.

FIG. 8 shows exemplary SLM conditions in the SLM step S2, indicating a relationship between the thickness of the alloy powder bed and the local heat input. In FIG. 8, "o" signifies the AM articles observed to have an average segregation cell size within a range of 0.15 to 1.5 μm and judged as "Passed", and "x" signifies the other AM articles, judged as "Failed".

Based on the results of Experimental 2, it has been confirmed that in the selective laser melting step S2, the SLM process is preferably performed while controlling the thickness of the alloy powder bed h (unit: μm), the output power of the laser beam P (unit: W), and the scanning speed of the laser beam S (unit: mm/s) such that they satisfy the following formulas: "15<h<150" and "67×(P/S)−3.5<h<2222×(P/S)+13". In other words, the hatched region is the passed region.

[Experimental 3]
(Examination of Heat Treatment Conditions in First Heat Treatment Step)

AM articles (10 mm in diameter×50 mm in length) were formed of the alloy powders IA-5 and IA-6 prepared in Experimental 1 by the SLM method (the selective laser melting step S2). The thickness of each alloy powder bed h and the output power of the laser beam P were set at 100 μm and 100 W, respectively. The local heat input P/S (unit: W×s/mm=J/mm) was controlled by varying the scanning speed (mm/s) of the laser beam S so as to satisfy the passing conditions examined in Experimental 2.

Each AM article formed above was subjected to heat treatment in a temperature range of 950 to 1,250° C. with a holding duration range of 2 to 4 hours (the first heat treatment step S3). Next, each AM article conducted with the first heat treatment was subjected to heat treatment at 900° C. with a holding duration of 4 hours (the second heat treatment step S4) to manufacture a Co based alloy product (IAP-5a to IAP-5d, and IAP-6a to IAP-6d) formed of the powder IA-5 or the powder IA-6. Test pieces for mechanical properties testing were taken from the Co based alloy products and subjected to mechanical properties testing.

As to the mechanical properties testing, a creep test was conducted at 850° C. under a stress of 168 MPa to measure the creep rupture time. Based on the prescribed properties of high temperature members toward which the invention is directed, any creep rupture time of 1,200 hours or more was judged as "Passed", and any creep rupture time of less than 1,200 hours was judged as "Failed". Such creep properties can be deemed as comparable to those of Ni based alloy materials.

The results of Experimental 3 are shown in Table 2.

TABLE 2

First Heat Treatment Temperature and Creep Testing Results of Alloy Products IAP-5a to IAP-5d and IAP-6a to IAP-6d.

| Alloy Product No. | Alloy Powder No. | First Heat Treatment Temperature (° C.) | Creep Test |
|---|---|---|---|
| IAP-5a | IA-5 | 1250 | Failed |
| IAP-5b | | 1150 | Failed |
| IAP-5c | | 1050 | Passed |
| IAP-5d | | 950 | Passed |
| IAP-6a | IA-6 | 1250 | Failed |
| IAP-6b | | 1150 | Failed |
| IAP-6c | | 1050 | Passed |
| IAP-6d | | 950 | Passed |

As shown in Table 2, the test pieces heat treated at 1,100° C. or more failed the mechanical properties. In contrast, the test pieces heat treated at lower than 1,100° C. all passed the mechanical properties. This is because the precipitation reinforcing carbide phase grains (the MC type carbide phase grains) and the grain boundary strengthening carbide phase grains (the $M_{23}C_6$ type carbide phase grains) are dispersedly precipitated with a favorable configuration, in addition to the matrix phase crystal grains with an appropriate average grain size.

[Experimental 4]

(Manufacturing of Alloy Products IAP-1-1 to IAP-7-1 Formed of Powders IA-1 to IA-5 and Alloy Products CAP-1-1 to CAP-5-1 Formed of Powders CA-1 to CA-5)

An AM article (10 mm in diameter×50 mm in length) was formed of each of the alloy powders IA-1 to IA-7 and CA-1 to CA-5 prepared in Experimental 1 by the SLM process (the selective laser melting step S2).

Each AM article formed above was subjected to heat treatment at 1,000° C. with a holding duration of 4 hours (the first heat treatment step S3). Next, each AM article conducted with the first heat treatment was subjected to heat treatment at 850° C. with a holding duration of 1 hour (the second heat treatment step S4) to manufacture Co based alloy products IAP-1-1 to IAP-7-1 formed of the powders IA-1 to IA-7 and Co based alloy products CAP-1-1 to CAP-5-1 formed of the powders CA-1 to CA-5.

(Microstructure Observation and Mechanical Properties Testing)

Test pieces for microstructure observation and mechanical properties testing were taken from the Co based alloy products IAP-1-1 to IAP-7-1 and CAP-1-1 to CAP-5-1 and subjected to microstructure observation and mechanical properties testing.

The microstructure observation was performed by SEM and through image analysis of SEM images thereof in a similar manner to Experimental 2 to check for co-presence of the precipitation reinforcing carbide phase grains and the grain boundary strengthening carbide phase grains, and to measure the average intergrain distance of precipitation reinforcing carbide phase grains in the matrix phase crystal grains. Also, the mechanical properties test was performed by the creep test in a similar manner to Experimental 3, and passed/failed for each of the test pieces was judged based on the same criterion in Experimental 3.

The results of Experimental 4 are shown in Table 3.

As shown in Table 3, it is confirmed that the inventive alloy products IAP-1-1 to IAP-7-1 according to the invention have microstructures in that the precipitation reinforcing carbide phase grains and the grain boundary strengthening carbide phase grains are co-precipitated, and that the average intergrain distance of precipitation reinforcing carbide phase grains in the matrix phase crystal grains is within a range of 0.15 to 1.5 µm. Also, it is recognized that all of these test pieces pass the mechanical properties.

On the other hand, the comparative alloy products CAP-1-1 to CAP-5-1 all failed the creep testing, although the precipitation reinforcing carbide phase grains and the grain boundary strengthening carbide phase grains are co-precipitated in CAP-1-1 to CAP-3-1. To determine possible causes behind this, the comparative alloy products CAP-1-1 to CAP-5-1 were examined individually.

Regarding CAP-1-1, the excessive contents of C and Cr have resulted in excessive precipitation of Cr carbide grains. Regarding CAP-2-1, the excessive content of C and the excessive total content of "Ti+Zr+Hf+V+Nb+Ta" have resulted in coarsening of the precipitation reinforcing carbide phase grains and an increased average intergrain distance of the precipitation reinforcing carbide phase grains. Regarding CAP-3-1, the excessive content of C, the insufficient content of N and the insufficient total content of "Ti+Zr+Hf+V+Nb+Ta" have resulted in excessive precipitation of the Cr carbide grains and an increased average intergrain distance of the precipitation reinforcing carbide phase grains. These results confirm that excessive precipitation of Cr carbide grains and/or an increased average intergrain distance of the precipitation reinforcing carbide phase grains lead to insufficient mechanical properties.

Regarding CAP-4-1 and CAP-5-1, insufficient total content of "Ti+Zr+Hf+V+Nb+Ta" (almost none) has resulted in no formation of the segregation cells in the AM articles through the selective laser melting step S2 and no formation of the precipitation reinforcing carbide phase grains in the matrix phase crystal grains through the first heat treatment step S3 and the second heat treatment step S4. Therefore, it can be considered that no formation of the precipitation reinforcing carbide phase grains in the matrix phase crystal grains has led to failure in the mechanical properties.

Based on the results of Experimental 4, it has been confirmed that IA-1 to IA-7, which have the chemical

TABLE 3

Measurement and Testing Results of Alloy Products IAP-1-1 to IAP-7-1 and CAP-1-1 to CAP-5-1.

| Alloy Product No. | Alloy Powder No. | Co-presence of Precipitation Reinforcing Carbide Phase Grains and Grain Boundary Strengthening Carbide Phase Grains | Average Intergrain Distance of Precipitation Reinforcing Carbide Phase Grains (µm) | Creep Test |
|---|---|---|---|---|
| IAP-1-1 | IA-1 | Co-precipitated | 0.55 | Passed |
| IAP-2-1 | IA-2 | Co-precipitated | 0.45 | Passed |
| IAP-3-1 | IA-3 | Co-precipitated | 1.5 | Passed |
| IAP-4-1 | IA-4 | Co-precipitated | 0.65 | Passed |
| IAP-5-1 | IA-5 | Co-precipitated | 0.55 | Passed |
| IAP-6-1 | IA-6 | Co-precipitated | 0.15 | Passed |
| IAP-7-1 | IA-7 | Co-precipitated | 0.80 | Passed |
| CAP-1-1 | CA-1 | Co-precipitated | 0.55 | Failed |
| CAP-2-1 | CA-2 | Co-precipitated | 2.8 | Failed |
| CAP-3-1 | CA-3 | Co-precipitated | 2.5 | Failed |
| CAP-4-1 | CA-4 | Not Precipitated | 120*) | Failed |
| CAP-5-1 | CA-5 | Not Precipitated | 100*) | Failed |

*)Average size of the matrix phase crystal grains is entered because the precipitation reinforcing carbide phase grains were not formed.

compositions specified in the invention, are desirable as starting materials for Co based alloy products. It has also been confirmed that dispersed formation of the precipitation reinforcing carbide phase grains within a range of 0.15 to 1.5 μm in the matrix phase crystal grains and precipitation of the grain boundary strengthening carbide phase grains on the grain boundaries of matrix phase crystal grains have led to improving the creep properties of the Co based alloy products.

The above-described embodiments and Examples have been specifically given in order to help with understanding on the present invention, but the invention is not limited to the described embodiments and Examples. For example, a part of an embodiment may be replaced by known art, or added with known art. That is, a part of an embodiment of the invention may be combined with known art and modified based on known art, as far as no departing from a technical concept of the invention.

LEGEND

100 . . . turbine stator blade;
101 . . . inner ring side end wall;
102 . . . blade part;
103 . . . outer ring side end wall;
200 . . . gas turbine;
210 . . . compression part;
220 . . . turbine part;
221 . . . turbine nozzle;
300 . . . heat exchanger;
301 . . . separation layer;
302 . . . fin layer; and
303 . . . side bar portion.

The invention claimed is:

1. A product formed of a cobalt based alloy, the cobalt based alloy having a chemical composition comprising:
   0.08 to 0.25 mass % of carbon;
   0.1 mass % or less of boron;
   10 to 30 mass % of chromium;
   5 mass % or less of iron, 30 mass % or less of nickel, the total amount of the iron and the nickel being 30 mass % or less;
   tungsten and/or molybdenum, the total amount of the tungsten and the molybdenum being 5 to 12 mass %;
   at least one of titanium, zirconium, hafnium, vanadium, niobium and tantalum, the total amount of the titanium, the zirconium, the hafnium, the vanadium, the niobium and the tantalum being 0.5 to 2 mass %;
   0.5 mass % or less of silicon;
   0.5 mass % or less of manganese;
   0.003 to 0.04 mass % of nitrogen; and
   the balance being cobalt and impurities, the impurities including 0.5 mass % or less of aluminum, and 0.04 mass % or less of oxygen,
   wherein the product is a polycrystalline body of matrix phase crystal grains, and
   wherein in the polycrystalline body MC carbide phase grains and $M_{23}C_6$ carbide phase grains are co-precipitated, the MC carbide phase grains being dispersively precipitated in the matrix phase crystal grains at an average intergrain distance of 0.13 to 2 μm, the $M_{23}C_6$ carbide phase grains being precipitated on grain boundaries of the matrix phase crystal grains, and
   wherein the MC carbide phase grains are grains of an MC carbide phase comprising the titanium, the zirconium, the hafnium, the vanadium, the niobium and/or the tantalum; and the $M_{23}C_6$ carbide phase grains are grains of an $M_{23}C_6$ carbide phase comprising the chromium, the iron, the tungsten, the molybdenum and/or the manganese.

2. The product according to claim 1, wherein:
   in the case that the chemical composition includes the titanium, the content of titanium is 0.01 to 1 mass %;
   in the case that the chemical composition includes the zirconium, the content of zirconium is 0.05 to 1.5 mass %;
   in the case that the chemical composition includes the hafnium, the content of hafnium is 0.01 to 0.5 mass %;
   in the case that the chemical composition includes the vanadium, the content of vanadium is 0.01 to 0.5 mass %;
   in the case that the chemical composition includes the niobium, the content of niobium is 0.02 to 1 mass %; and
   in the case that the chemical composition includes the tantalum, the content of tantalum is 0.05 to 1.5 mass %.

3. The product according to claim 1, wherein the product exhibits a creep rupture time of 1,200 hours or more by a creep test under conditions of a temperature of 850° C. and a stress of 168 MPa.

4. The product according to claim 1, wherein
   the product is a turbine stator blade, a turbine rotor blade, a turbine combustor nozzle, or a heat exchanger.

5. The product according to claim 3, wherein
   the product exhibits a creep rupture time of 1,200 hours or more by a creep test under conditions of a temperature of 850° C. and a stress of 168 MPa.

6. A method for manufacturing the cobalt based alloy product according to claim 1, the method comprising:
   an alloy powder preparation step of preparing a cobalt based alloy powder having the chemical composition according to claim 1, the cobalt based alloy powder having a particle size;
   a selective laser melting step of forming an additively manufactured article, the step comprising alternate repetition of an alloy powder bed preparation substep of laying the cobalt based alloy powder such that it forms an alloy powder bed having a predetermined thickness and a laser melting solidification substep of irradiating a predetermined region of the alloy powder bed with a laser beam to locally melt and rapidly solidify the cobalt based alloy powder in the region, the laser beam having an output power and a scanning speed;
   a first heat treatment step of subjecting the additively manufactured article to a first heat treatment at a temperature ranging of 750° C. or more and less than 1,100° C.; and
   a second heat treatment step of subjecting the first heat-treated article to a second heat treatment at a temperature ranging from 600° C. to 1,000° C. but less than the temperature of the first heat treatment,
   wherein in the selective laser melting step, the predetermined thickness of the alloy powder bed h (unit: μm), the output power of the laser beam P (unit: W), and the scanning speed of the laser beam S (unit: mm/s) are controlled to satisfy the following formulas: "15<h<150" and "67×(P/S) 3.5<h<2222×(P/S)+13".

7. The method for manufacturing the cobalt based alloy product according to claim 6, wherein
   the alloy powder preparation step comprises an alloy powder classification substep of regulating the particle size of the cobalt based alloy powder to 5 to 100 μm.

* * * * *